United States Patent
Setuwanto et al.

(10) Patent No.: US 8,995,078 B1
(45) Date of Patent: Mar. 31, 2015

(54) METHOD OF TESTING A HEAD FOR CONTAMINATION

(71) Applicant: WD Media, LLC, San Jose, CA (US)

(72) Inventors: Hengky Setuwanto, Fremont, CA (US);
Thien Seng Lee, Bayan Lepas (MY);
Lingpin Ee, Singapore (SG)

(73) Assignee: WD Media, LLC, San Jose, CA (US)

(*) Notice: Subject to any disclaimer, the term of this patent is extended or adjusted under 35 U.S.C. 154(b) by 0 days.

(21) Appl. No.: 14/497,166

(22) Filed: Sep. 25, 2014

(51) Int. Cl.
G11B 5/41 (2006.01)
G11B 5/455 (2006.01)
G11B 21/12 (2006.01)
G11B 5/60 (2006.01)

(52) U.S. Cl.
CPC ... G11B 5/41 (2013.01); G11B 5/455 (2013.01); G11B 21/12 (2013.01); G11B 5/607 (2013.01); G11B 5/6076 (2013.01)
USPC .............................................. 360/55; 360/75

(58) Field of Classification Search
None
See application file for complete search history.

(56) References Cited

U.S. PATENT DOCUMENTS

| | | | |
|---|---|---|---|
| 6,013,161 A | 1/2000 | Chen et al. | |
| 6,063,248 A | 5/2000 | Bourez et al. | |
| 6,068,891 A | 5/2000 | O'Dell et al. | |
| 6,086,730 A | 7/2000 | Liu et al. | |
| 6,099,981 A | 8/2000 | Nishimori | |
| 6,103,404 A | 8/2000 | Ross et al. | |
| 6,117,499 A | 9/2000 | Wong et al. | |
| 6,136,403 A | 10/2000 | Prabhakara et al. | |
| 6,143,375 A | 11/2000 | Ross et al. | |
| 6,145,849 A | 11/2000 | Bae et al. | |
| 6,146,737 A | 11/2000 | Malhotra et al. | |
| 6,149,696 A | 11/2000 | Jia | |
| 6,150,015 A | 11/2000 | Bertero et al. | |
| 6,156,404 A | 12/2000 | Ross et al. | |
| 6,159,076 A | 12/2000 | Sun et al. | |
| 6,164,118 A | 12/2000 | Suzuki et al. | |
| 6,200,441 B1 | 3/2001 | Gornicki et al. | |
| 6,204,995 B1 | 3/2001 | Hokkyo et al. | |
| 6,206,765 B1 | 3/2001 | Sanders et al. | |
| 6,210,819 B1 | 4/2001 | Lal et al. | |
| 6,216,709 B1 | 4/2001 | Fung et al. | |
| 6,221,119 B1 | 4/2001 | Homola | |
| 6,248,395 B1 | 6/2001 | Homola et al. | |
| 6,249,393 B1 * | 6/2001 | Billings et al. | ............. 360/75 |
| 6,261,681 B1 | 7/2001 | Suekane et al. | |
| 6,270,885 B1 | 8/2001 | Hokkyo et al. | |
| 6,274,063 B1 | 8/2001 | Li et al. | |
| 6,283,838 B1 | 9/2001 | Blake et al. | |
| 6,287,429 B1 | 9/2001 | Moroishi et al. | |
| 6,290,573 B1 | 9/2001 | Suzuki | |
| 6,299,947 B1 | 10/2001 | Suzuki et al. | |
| 6,303,217 B1 | 10/2001 | Malhotra et al. | |
| 6,309,765 B1 | 10/2001 | Suekane et al. | |

(Continued)

Primary Examiner — Wayne Young
Assistant Examiner — James L. Habermehl

(57) ABSTRACT

A method of testing a head for contamination includes detecting a first touchdown power of the head, the head having a flying height actuator; calculating a back-off power for the head using an estimated relationship between back-off power and touchdown power; determining an operating power that is equal to the detected first touchdown power minus the calculated back-off power; passing the head over a magnetic media one or more times while applying the determined operating power to the flying height actuator; detecting a second touchdown power after passing the head over the magnetic media; and determining whether contamination on the head exceeds a threshold amount based on the detected second touchdown power.

21 Claims, 4 Drawing Sheets

(56) References Cited

U.S. PATENT DOCUMENTS

| | | | |
|---|---|---|---|
| 6,358,636 B1 | 3/2002 | Yang et al. | |
| 6,362,452 B1 | 3/2002 | Suzuki et al. | |
| 6,363,599 B1 | 4/2002 | Bajorek | |
| 6,365,012 B1 | 4/2002 | Sato et al. | |
| 6,381,090 B1 | 4/2002 | Suzuki et al. | |
| 6,381,092 B1 | 4/2002 | Suzuki | |
| 6,387,483 B1 | 5/2002 | Hokkyo et al. | |
| 6,391,213 B1 | 5/2002 | Homola | |
| 6,395,349 B1 | 5/2002 | Salamon | |
| 6,403,919 B1 | 6/2002 | Salamon | |
| 6,408,677 B1 | 6/2002 | Suzuki | |
| 6,411,458 B1 * | 6/2002 | Billings et al. | 360/75 |
| 6,426,157 B1 | 7/2002 | Hokkyo et al. | |
| 6,429,984 B1 | 8/2002 | Alex | |
| 6,482,330 B1 | 11/2002 | Bajorek | |
| 6,482,505 B1 | 11/2002 | Bertero et al. | |
| 6,500,567 B1 | 12/2002 | Bertero et al. | |
| 6,528,124 B1 | 3/2003 | Nguyen | |
| 6,548,821 B1 | 4/2003 | Treves et al. | |
| 6,552,871 B2 | 4/2003 | Suzuki et al. | |
| 6,565,719 B1 | 5/2003 | Lairson et al. | |
| 6,566,674 B1 | 5/2003 | Treves et al. | |
| 6,571,806 B2 | 6/2003 | Rosano et al. | |
| 6,628,466 B2 | 9/2003 | Alex | |
| 6,664,503 B1 | 12/2003 | Hsieh et al. | |
| 6,670,055 B2 | 12/2003 | Tomiyasu et al. | |
| 6,682,807 B2 | 1/2004 | Lairson et al. | |
| 6,683,754 B2 | 1/2004 | Suzuki et al. | |
| 6,730,420 B1 | 5/2004 | Bertero et al. | |
| 6,743,528 B2 | 6/2004 | Suekane et al. | |
| 6,759,138 B2 | 7/2004 | Tomiyasu et al. | |
| 6,778,353 B1 | 8/2004 | Harper | |
| 6,795,274 B1 | 9/2004 | Hsieh et al. | |
| 6,855,232 B2 | 2/2005 | Jairson et al. | |
| 6,857,937 B2 | 2/2005 | Bajorek | |
| 6,893,748 B2 | 5/2005 | Bertero et al. | |
| 6,899,959 B2 | 5/2005 | Bertero et al. | |
| 6,916,558 B2 | 7/2005 | Umezawa et al. | |
| 6,939,120 B1 | 9/2005 | Harper | |
| 6,946,191 B2 | 9/2005 | Morikawa et al. | |
| 6,967,798 B2 | 11/2005 | Homola et al. | |
| 6,972,135 B2 | 12/2005 | Homola | |
| 7,004,827 B1 | 2/2006 | Suzuki et al. | |
| 7,006,323 B1 | 2/2006 | Suzuki | |
| 7,016,154 B2 | 3/2006 | Nishihira | |
| 7,019,924 B2 | 3/2006 | McNeil et al. | |
| 7,045,215 B2 | 5/2006 | Shimokawa | |
| 7,070,870 B2 | 7/2006 | Bertero et al. | |
| 7,088,532 B1 * | 8/2006 | Krajnovich et al. | 360/75 |
| 7,090,934 B2 | 8/2006 | Hokkyo et al. | |
| 7,095,578 B2 * | 8/2006 | Ma | 360/75 |
| 7,099,112 B1 | 8/2006 | Harper | |
| 7,105,241 B2 | 9/2006 | Shimokawa et al. | |
| 7,119,990 B2 | 10/2006 | Bajorek et al. | |
| 7,147,790 B2 | 12/2006 | Wachenschwanz et al. | |
| 7,161,753 B2 | 1/2007 | Wachenschwanz et al. | |
| 7,166,319 B2 | 1/2007 | Ishiyama | |
| 7,166,374 B2 | 1/2007 | Suekane et al. | |
| 7,169,487 B2 | 1/2007 | Kawai et al. | |
| 7,174,775 B2 | 2/2007 | Ishiyama | |
| 7,179,549 B2 | 2/2007 | Malhotra et al. | |
| 7,184,139 B2 | 2/2007 | Treves et al. | |
| 7,196,860 B2 | 3/2007 | Alex | |
| 7,199,977 B2 | 4/2007 | Suzuki et al. | |
| 7,208,236 B2 | 4/2007 | Morikawa et al. | |
| 7,220,500 B1 | 5/2007 | Tomiyasu et al. | |
| 7,229,266 B2 | 6/2007 | Harper | |
| 7,239,970 B2 | 7/2007 | Treves et al. | |
| 7,252,897 B2 | 8/2007 | Shimokawa et al. | |
| 7,277,254 B2 | 10/2007 | Shimokawa et al. | |
| 7,281,920 B2 | 10/2007 | Homola et al. | |
| 7,292,329 B2 | 11/2007 | Treves et al. | |
| 7,301,726 B1 | 11/2007 | Suzuki | |
| 7,302,148 B2 | 11/2007 | Treves et al. | |
| 7,305,119 B2 | 12/2007 | Treves et al. | |
| 7,314,404 B2 | 1/2008 | Singh et al. | |
| 7,320,584 B1 | 1/2008 | Harper et al. | |
| 7,329,114 B2 | 2/2008 | Harper et al. | |
| 7,375,362 B2 | 5/2008 | Treves et al. | |
| 7,420,886 B2 | 9/2008 | Tomiyasu et al. | |
| 7,425,719 B2 | 9/2008 | Treves et al. | |
| 7,436,620 B1 * | 10/2008 | Kang et al. | 360/75 |
| 7,471,484 B2 | 12/2008 | Wachenschwanz et al. | |
| 7,489,466 B2 | 2/2009 | Knigge et al. | |
| 7,498,062 B2 | 3/2009 | Calcaterra et al. | |
| 7,531,485 B2 | 5/2009 | Hara et al. | |
| 7,537,846 B2 | 5/2009 | Ishiyama et al. | |
| 7,549,209 B2 | 6/2009 | Wachenschwanz et al. | |
| 7,561,367 B2 * | 7/2009 | Schreck | 360/75 |
| 7,569,490 B2 | 8/2009 | Staud | |
| 7,597,792 B2 | 10/2009 | Homola et al. | |
| 7,597,973 B2 | 10/2009 | Ishiyama | |
| 7,608,193 B2 | 10/2009 | Wachenschwanz et al. | |
| 7,632,087 B2 | 12/2009 | Homola | |
| 7,636,217 B2 * | 12/2009 | Uji et al. | 360/53 |
| 7,656,615 B2 | 2/2010 | Wachenschwanz et al. | |
| 7,682,546 B2 | 3/2010 | Harper | |
| 7,684,152 B2 | 3/2010 | Suzuki et al. | |
| 7,686,606 B2 | 3/2010 | Harper et al. | |
| 7,686,991 B2 | 3/2010 | Harper | |
| 7,695,833 B2 | 4/2010 | Ishiyama | |
| 7,722,968 B2 | 5/2010 | Ishiyama | |
| 7,733,605 B2 | 6/2010 | Suzuki et al. | |
| 7,736,768 B2 | 6/2010 | Ishiyama | |
| 7,755,861 B1 | 7/2010 | Li et al. | |
| 7,758,732 B1 | 7/2010 | Calcaterra et al. | |
| 7,796,356 B1 | 9/2010 | Fowler et al. | |
| 7,800,858 B1 | 9/2010 | Bajikar et al. | |
| 7,826,163 B2 * | 11/2010 | Harmer et al. | 360/75 |
| 7,833,639 B2 | 11/2010 | Sonobe et al. | |
| 7,833,641 B2 | 11/2010 | Tomiyasu et al. | |
| 7,910,159 B2 | 3/2011 | Jung | |
| 7,911,736 B2 | 3/2011 | Bajorek | |
| 7,924,519 B2 | 4/2011 | Lambert | |
| 7,944,165 B1 | 5/2011 | O'Dell | |
| 7,944,643 B1 | 5/2011 | Jiang et al. | |
| 7,955,723 B2 | 6/2011 | Umezawa et al. | |
| 7,983,003 B2 | 7/2011 | Sonobe et al. | |
| 7,993,497 B2 | 8/2011 | Moroishi et al. | |
| 7,993,765 B2 | 8/2011 | Kim et al. | |
| 7,998,912 B2 | 8/2011 | Chen et al. | |
| 8,002,901 B1 | 8/2011 | Chen et al. | |
| 8,003,237 B2 | 8/2011 | Sonobe et al. | |
| 8,012,920 B2 | 9/2011 | Shimokawa | |
| 8,038,863 B2 | 10/2011 | Homola | |
| 8,057,926 B2 | 11/2011 | Ayama et al. | |
| 8,062,778 B2 | 11/2011 | Suzuki et al. | |
| 8,064,156 B1 | 11/2011 | Suzuki et al. | |
| 8,076,013 B2 | 12/2011 | Sonobe et al. | |
| 8,085,488 B2 | 12/2011 | Feliss et al. | |
| 8,092,931 B2 | 1/2012 | Ishiyama et al. | |
| 8,100,685 B1 | 1/2012 | Harper et al. | |
| 8,101,054 B2 | 1/2012 | Chen et al. | |
| 8,125,723 B1 | 2/2012 | Nichols et al. | |
| 8,125,724 B1 | 2/2012 | Nichols et al. | |
| 8,137,517 B1 | 3/2012 | Bourez | |
| 8,139,310 B2 | 3/2012 | Hogg | |
| 8,142,916 B2 | 3/2012 | Umezawa et al. | |
| 8,163,093 B1 | 4/2012 | Chen et al. | |
| 8,171,949 B1 | 5/2012 | Lund et al. | |
| 8,173,282 B1 | 5/2012 | Sun et al. | |
| 8,178,480 B2 | 5/2012 | Hamakubo et al. | |
| 8,206,789 B2 | 6/2012 | Suzuki | |
| 8,218,260 B2 | 7/2012 | Iamratanakul et al. | |
| 8,247,095 B2 | 8/2012 | Champion et al. | |
| 8,257,783 B2 | 9/2012 | Suzuki et al. | |
| 8,279,550 B1 | 10/2012 | Hogg | |
| 8,298,609 B1 | 10/2012 | Liew et al. | |
| 8,298,689 B2 | 10/2012 | Sonobe et al. | |
| 8,309,239 B2 | 11/2012 | Umezawa et al. | |

(56) References Cited

U.S. PATENT DOCUMENTS

| | | |
|---|---|---|
| 8,316,668 B1 | 11/2012 | Chan et al. |
| 8,331,056 B2 | 12/2012 | O'Dell |
| 8,354,618 B1 | 1/2013 | Chen et al. |
| 8,367,228 B2 | 2/2013 | Sonobe et al. |
| 8,383,209 B2 | 2/2013 | Ayama |
| 8,394,243 B1 | 3/2013 | Jung et al. |
| 8,397,751 B1 | 3/2013 | Chan et al. |
| 8,399,809 B1 | 3/2013 | Bourez |
| 8,402,638 B1 | 3/2013 | Treves et al. |
| 8,404,056 B1 | 3/2013 | Chen et al. |
| 8,404,369 B2 | 3/2013 | Ruffini et al. |
| 8,404,370 B2 | 3/2013 | Sato et al. |
| 8,406,918 B1 | 3/2013 | Tan et al. |
| 8,414,966 B2 | 4/2013 | Yasumori et al. |
| 8,425,975 B2 | 4/2013 | Ishiyama |
| 8,431,257 B2 | 4/2013 | Kim et al. |
| 8,431,258 B2 | 4/2013 | Onoue et al. |
| 8,453,315 B2 | 6/2013 | Kajiwara et al. |
| 8,488,276 B1 | 7/2013 | Jung et al. |
| 8,491,800 B1 | 7/2013 | Dorsey |
| 8,492,009 B1 | 7/2013 | Homola et al. |
| 8,492,011 B2 | 7/2013 | Itoh et al. |
| 8,496,466 B1 | 7/2013 | Treves et al. |
| 8,517,364 B1 | 8/2013 | Crumley et al. |
| 8,517,657 B2 | 8/2013 | Chen et al. |
| 8,524,052 B1 | 9/2013 | Tan et al. |
| 8,530,065 B1 | 9/2013 | Chernyshov et al. |
| 8,546,000 B2 | 10/2013 | Umezawa |
| 8,551,253 B2 | 10/2013 | Na'im et al. |
| 8,551,627 B2 | 10/2013 | Shimada et al. |
| 8,556,566 B1 | 10/2013 | Suzuki et al. |
| 8,559,131 B2 | 10/2013 | Masuda et al. |
| 8,562,748 B1 | 10/2013 | Chen et al. |
| 8,565,050 B1 | 10/2013 | Bertero et al. |
| 8,570,844 B1 | 10/2013 | Yuan et al. |
| 8,580,410 B2 | 11/2013 | Onoue |
| 8,584,687 B1 | 11/2013 | Chen et al. |
| 8,591,709 B1 | 11/2013 | Lim et al. |
| 8,592,061 B2 | 11/2013 | Onoue et al. |
| 8,596,287 B1 | 12/2013 | Chen et al. |
| 8,597,723 B1 | 12/2013 | Jung et al. |
| 8,603,649 B2 | 12/2013 | Onoue |
| 8,603,650 B2 | 12/2013 | Sonobe et al. |
| 8,605,388 B2 | 12/2013 | Yasumori et al. |
| 8,605,555 B1 | 12/2013 | Chernyshov et al. |
| 8,608,147 B1 | 12/2013 | Yap et al. |
| 8,609,263 B1 | 12/2013 | Chernyshov et al. |
| 8,619,381 B2 | 12/2013 | Moser et al. |
| 8,623,528 B2 | 1/2014 | Umezawa et al. |
| 8,623,529 B2 | 1/2014 | Suzuki |
| 8,634,155 B2 | 1/2014 | Yasumori et al. |
| 8,658,003 B1 | 2/2014 | Bourez |
| 8,658,292 B1 | 2/2014 | Mallary et al. |
| 8,665,541 B2 | 3/2014 | Saito |
| 8,665,546 B1 | 3/2014 | Zhao et al. |
| 8,668,953 B1 | 3/2014 | Buechel-Rimmel |
| 8,674,327 B1 | 3/2014 | Poon et al. |
| 8,685,214 B1 | 4/2014 | Moh et al. |
| 8,696,404 B2 | 4/2014 | Sun et al. |
| 8,711,499 B1 | 4/2014 | Desai et al. |
| 8,743,666 B1 | 6/2014 | Bertero et al. |
| 8,758,912 B2 | 6/2014 | Srinivasan et al. |
| 8,787,124 B1 | 7/2014 | Chernyshov et al. |
| 8,787,130 B1 | 7/2014 | Yuan et al. |
| 8,791,391 B2 | 7/2014 | Bourez |
| 8,795,765 B2 | 8/2014 | Koike et al. |
| 8,795,790 B2 | 8/2014 | Sonobe et al. |
| 8,795,857 B2 | 8/2014 | Ayama et al. |
| 8,800,322 B1 | 8/2014 | Chan et al. |
| 8,811,129 B1 | 8/2014 | Yuan et al. |
| 8,817,410 B1 | 8/2014 | Moser et al. |
| 2002/0060883 A1 | 5/2002 | Suzuki |
| 2003/0022024 A1 | 1/2003 | Wachenschwanz |
| 2004/0022387 A1 | 2/2004 | Weikle |
| 2004/0132301 A1 | 7/2004 | Harper et al. |
| 2004/0202793 A1 | 10/2004 | Harper et al. |
| 2004/0202865 A1 | 10/2004 | Homola et al. |
| 2004/0209123 A1 | 10/2004 | Bajorek et al. |
| 2004/0209470 A1 | 10/2004 | Bajorek |
| 2005/0036223 A1 | 2/2005 | Wachenschwanz et al. |
| 2005/0142990 A1 | 6/2005 | Homola |
| 2005/0150862 A1 | 7/2005 | Harper et al. |
| 2005/0151282 A1 | 7/2005 | Harper et al. |
| 2005/0151283 A1 | 7/2005 | Bajorek et al. |
| 2005/0151300 A1 | 7/2005 | Harper et al. |
| 2005/0155554 A1 | 7/2005 | Saito |
| 2005/0167867 A1 | 8/2005 | Bajorek et al. |
| 2005/0263401 A1 | 12/2005 | Olsen et al. |
| 2006/0147758 A1 | 7/2006 | Jung et al. |
| 2006/0181697 A1 | 8/2006 | Treves et al. |
| 2006/0207890 A1 | 9/2006 | Staud |
| 2007/0062561 A1 | 3/2007 | Koch et al. |
| 2007/0070549 A1 | 3/2007 | Suzuki et al. |
| 2007/0245909 A1 | 10/2007 | Homola |
| 2007/0291401 A1* | 12/2007 | Sun et al. .................. 360/75 |
| 2008/0075845 A1 | 3/2008 | Sonobe et al. |
| 2008/0093760 A1 | 4/2008 | Harper et al. |
| 2009/0117408 A1 | 5/2009 | Umezawa et al. |
| 2009/0136784 A1 | 5/2009 | Suzuki et al. |
| 2009/0169922 A1 | 7/2009 | Ishiyama |
| 2009/0191331 A1 | 7/2009 | Umezawa et al. |
| 2009/0202866 A1 | 8/2009 | Kim et al. |
| 2009/0311557 A1 | 12/2009 | Onoue et al. |
| 2010/0143752 A1 | 6/2010 | Ishibashi et al. |
| 2010/0190035 A1 | 7/2010 | Sonobe et al. |
| 2010/0196619 A1 | 8/2010 | Ishiyama |
| 2010/0196740 A1 | 8/2010 | Ayama et al. |
| 2010/0209601 A1 | 8/2010 | Shimokawa et al. |
| 2010/0215992 A1 | 8/2010 | Horikawa et al. |
| 2010/0232065 A1 | 9/2010 | Suzuki et al. |
| 2010/0247965 A1 | 9/2010 | Onoue |
| 2010/0261039 A1 | 10/2010 | Itoh et al. |
| 2010/0279151 A1 | 11/2010 | Sakamoto et al. |
| 2010/0300884 A1 | 12/2010 | Homola et al. |
| 2010/0304186 A1 | 12/2010 | Shimokawa |
| 2011/0097603 A1 | 4/2011 | Onoue |
| 2011/0097604 A1 | 4/2011 | Onoue |
| 2011/0171495 A1 | 7/2011 | Tachibana et al. |
| 2011/0206947 A1 | 8/2011 | Tachibana et al. |
| 2011/0212346 A1 | 9/2011 | Onoue et al. |
| 2011/0223446 A1 | 9/2011 | Onoue et al. |
| 2011/0244119 A1 | 10/2011 | Umezawa et al. |
| 2011/0299194 A1 | 12/2011 | Aniya et al. |
| 2011/0311841 A1 | 12/2011 | Saito et al. |
| 2012/0069466 A1 | 3/2012 | Okamoto et al. |
| 2012/0070692 A1 | 3/2012 | Sato et al. |
| 2012/0077060 A1 | 3/2012 | Ozawa |
| 2012/0127599 A1 | 5/2012 | Shimokawa et al. |
| 2012/0127601 A1 | 5/2012 | Suzuki et al. |
| 2012/0129009 A1 | 5/2012 | Sato et al. |
| 2012/0140359 A1 | 6/2012 | Tachibana |
| 2012/0141833 A1 | 6/2012 | Umezawa et al. |
| 2012/0141835 A1 | 6/2012 | Sakamoto |
| 2012/0148875 A1 | 6/2012 | Hamakubo et al. |
| 2012/0156523 A1 | 6/2012 | Seki et al. |
| 2012/0164488 A1 | 6/2012 | Shin et al. |
| 2012/0170152 A1 | 7/2012 | Sonobe et al. |
| 2012/0171369 A1 | 7/2012 | Koike et al. |
| 2012/0175243 A1 | 7/2012 | Fukuura et al. |
| 2012/0189872 A1 | 7/2012 | Umezawa et al. |
| 2012/0196049 A1 | 8/2012 | Azuma et al. |
| 2012/0207919 A1 | 8/2012 | Sakamoto et al. |
| 2012/0225217 A1 | 9/2012 | Itoh et al. |
| 2012/0251842 A1 | 10/2012 | Yuan et al. |
| 2012/0251846 A1 | 10/2012 | Desai et al. |
| 2012/0276417 A1 | 11/2012 | Shimokawa et al. |
| 2012/0308722 A1 | 12/2012 | Suzuki et al. |
| 2013/0040167 A1 | 2/2013 | Alagarsamy et al. |
| 2013/0071694 A1 | 3/2013 | Srinivasan et al. |
| 2013/0165029 A1 | 6/2013 | Sun et al. |
| 2013/0175252 A1 | 7/2013 | Bourez |
| 2013/0216865 A1 | 8/2013 | Yasumori et al. |
| 2013/0230647 A1 | 9/2013 | Onoue et al. |
| 2013/0314815 A1 | 11/2013 | Yuan et al. |

(56) References Cited

U.S. PATENT DOCUMENTS

| | | |
|---|---|---|
| 2014/0011054 A1 | 1/2014 | Suzuki |
| 2014/0044992 A1 | 2/2014 | Onoue |
| 2014/0050843 A1 | 2/2014 | Yi et al. |
| 2014/0151360 A1 | 6/2014 | Gregory et al. |
| 2014/0234666 A1 | 8/2014 | Knigge et al. |

* cited by examiner

METHOD OF TESTING A HEAD FOR CONTAMINATION

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a magnetic hard disk drive, the head comprises a body called a "slider" that carries a magnetic transducer on its trailing end. The magnetic transducer comprises a writer and a read element. The magnetic transducer's writer may be of a longitudinal or perpendicular design, and the read element of the magnetic transducer may be inductive or magnetoresistive. In a magnetic hard disk drive, the transducer is supported in proximity to the magnetic disk by a hydrodynamic air bearing. As the motor rotates the magnetic disk, the hydrodynamic air bearing is formed between an air bearing surface of the slider of the head, and a surface of the magnetic disk. The thickness of the air bearing at the location of the transducer is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

The flying height is a parameter that affects the performance of an information storage device. Accordingly, the nominal flying height is typically chosen as a careful compromise between each extreme in a classic engineering "trade-off." If the flying height is too high, the ability of the transducer to write and/or read information to/from the disk surface is degraded. Therefore, reductions in flying height can facilitate desirable increases in the areal density of data stored on a disk surface. However, the air bearing between the slider and the disk surface cannot be eliminated entirely because the air bearing serves to reduce friction and wear (between the slider and the disk surface) to an acceptable level. Excessive reduction in the nominal flying height degrades the tribological performance of the disk drive to the point where the disk drive's lifetime and reliability become unacceptable.

One way that a disk drive designer can improve the prospects of reaching an acceptable compromise in the "trade-off" described above, is to increase the complexity of the disk drive so as to dynamically control flying height. That is, additional head components and/or disk drive components that can function as a flying height actuator are included and actively controlled so that the flying height can be temporarily reduced only while the head is reading or writing. When the head is not reading or writing, it can "fly" at a slightly-higher nominal flying height to improve tribological performance. Such active control of flying height is sometimes referred to as "dynamic flying height" control (a.k.a. "DFH").

The magnetic disk, mentioned above, includes various layers deposited during the manufacturing process. Generally, the disk includes a thin film magnetic layer and a protective carbon-based overcoat. The layers of the disk and process steps for manufacturing the disk are known in the art. During the disk manufacturing process it is possible for metal contamination to occur in the carbon overcoat. It has been found that when operating a hard drive having a contaminated disk, the head will pick up (i.e., become contaminated) with the metal particles resulting in reduced performance.

Thus, there is a need in the art for a method for testing a head for contamination when operating with a magnetic disk.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
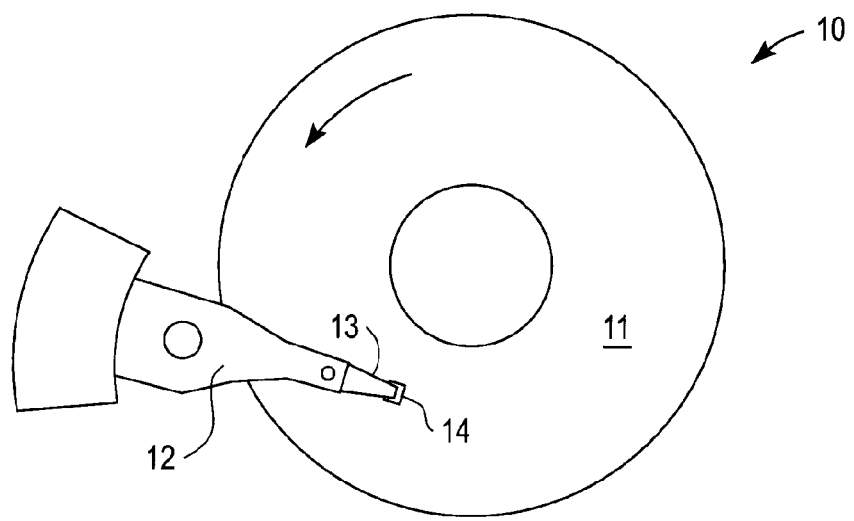
FIG. 1 is top conceptual view of an exemplary embodiment of a track seeking/track following actuator with an attached head gimbal assembly, positioned over a spinning disk in a disk drive.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus or method.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus, method or article of manufacture does not require that all embodiments of the invention include the described components, structure, features, functionality, processes, advantages, benefits, or modes of operation.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the terms "comprises," "comprising," "includes," and/or "including," when used herein, specify the presence of the stated features, integers, steps, operations, elements, and/or components, but do not preclude the presence or addition of one or more other features, integers, steps, operations, elements, components, and/or groups thereof.

In the following detailed description, various aspects of the present invention will be presented in the context of testing a read/write head for contamination when operating with a magnetic disk for use in a hard disk drive (HDD). However, those skilled in the art will realize that these aspects may be extended to any suitable application where contamination pickup occurs when operating a head over various types of disks in other contexts. Accordingly, any reference to a magnetic disk or a HDD is intended only to illustrate the various aspects of the present invention, with the understanding that such aspects may have a wide range of applications.

Aspects of a method of testing a head for contamination includes detecting a first touchdown power of the head, the head having a flying height actuator; calculating a back-off power for the head using an estimated relationship between back-off power and touchdown power; determining an operating power that is equal to the detected first touchdown power minus the calculated back-off power; passing the head over a magnetic media one or more times while applying the determined operating power to the flying height actuator; detecting a second touchdown power after passing the head over the magnetic media; and determining whether contamination on the head exceeds a threshold amount based on the detected second touchdown power.

Others aspects of a method of testing a head for contamination includes detecting an initial touchdown power of the head, the head having a flying height actuator; calculating a back-off power for the head using an estimated relationship between back-off power and touchdown power; applying an operating power to the flying height actuator that is equal to the detected initial touchdown power minus the calculated back-off power; passing the head over a magnetic media a plurality of times while applying the operating power to the head; detecting a subsequent touchdown power after each passing of the head over the magnetic media, thereby obtaining a plurality of subsequent touchdown powers; and determining whether contamination on the head exceeds a threshold amount based on at least one of the subsequent touchdown powers.

Other aspects of a method of testing a head for contamination include detecting a first touchdown power of the head at a plurality of discrete points along a radius of the magnetic media, the head having a flying height actuator; calculating a back-off power for the head for each of the plurality of discrete points using an estimated relationship between back-off power and touchdown power; determining an operating power for each of the plurality of discrete points, wherein the operating power for each of the plurality of discrete points is equal to the detected first touchdown power of a particular point minus a corresponding calculated back-off power for the particular point; passing the head over a magnetic media one or more times while applying the determined operating power to the flying height actuator for each of the plurality of discrete points; detecting a second touchdown power for each of the plurality of discrete points after passing the head over the magnetic media; and determining whether contamination on the head exceeds a threshold amount based on the detected second touchdown power for at least one of the discrete points.

It should be understood that other aspects of apparatuses and methods will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive A hard disk drive generally includes a head disk assembly (HDA) and a printed circuit board (PCB) attached to a disk drive base of the HDA. FIG. 1 illustrates exemplary embodiment of a head disk assembly. Referring now to FIG. 1, the head disk assembly 10 includes at least one disk 11 (such as a magnetic disk, magneto-optical disk, or optical disk), and a track seeking/track following actuator 12, and at least one head gimbal assembly (HGA) that includes a head 14 and a suspension assembly 13. During operation of the disk drive, the track seeking/track following actuator 12 must rotate to position the head 14 adjacent desired information tracks on the disk 11. An arrow on disk 11 indicates the direction of disk rotation in FIG. 1. Track seeking/track following actuator 12 is typically a rotary actuator driven by a voice coil motor. The disk 11 includes a conventional information storage media (e.g. hard magnetic layer protected by a thin overcoat layer and supported by a substrate and various underlayers).

Figure 2:
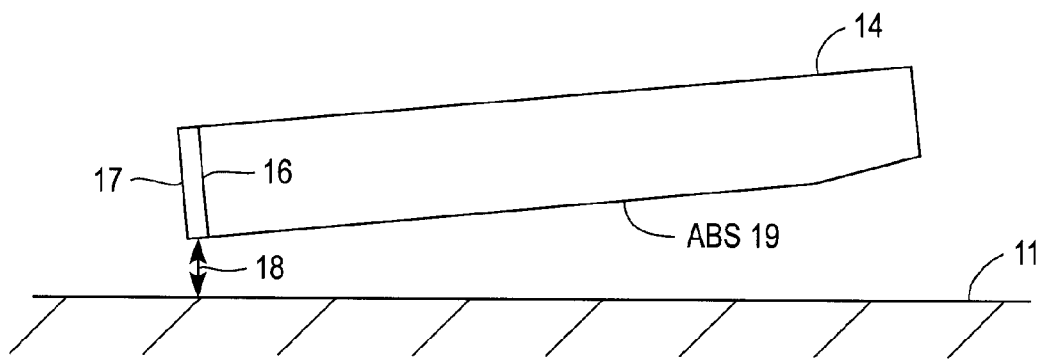
FIG. 2 is a side-view of an exemplary embodiment of a head in operation over a spinning disk.

FIG. 2 is a side-view of a head 14 in operation over a spinning disk 11, the head 14 being capable of use with an embodiment of the present invention. FIG. 2 is not to scale; rather, certain dimensions have been exaggerated so that the microscopic transducer-disk spacing 18 and slight pitch angle of air bearing surface (ABS) 19 can be discerned. The slider of head 14 includes a trailing face 16 on which a magnetic transducer 17 is fabricated by conventional photolithographic and vacuum deposition and etching techniques. The transducer 17 of head 14 can be positioned towards or away from the disk 11 relative to ABS 19 by a head-based flying height actuator, which may be included within transducer 17, so that the transducer-disk spacing 18 can be adjusted.

Figure 3:
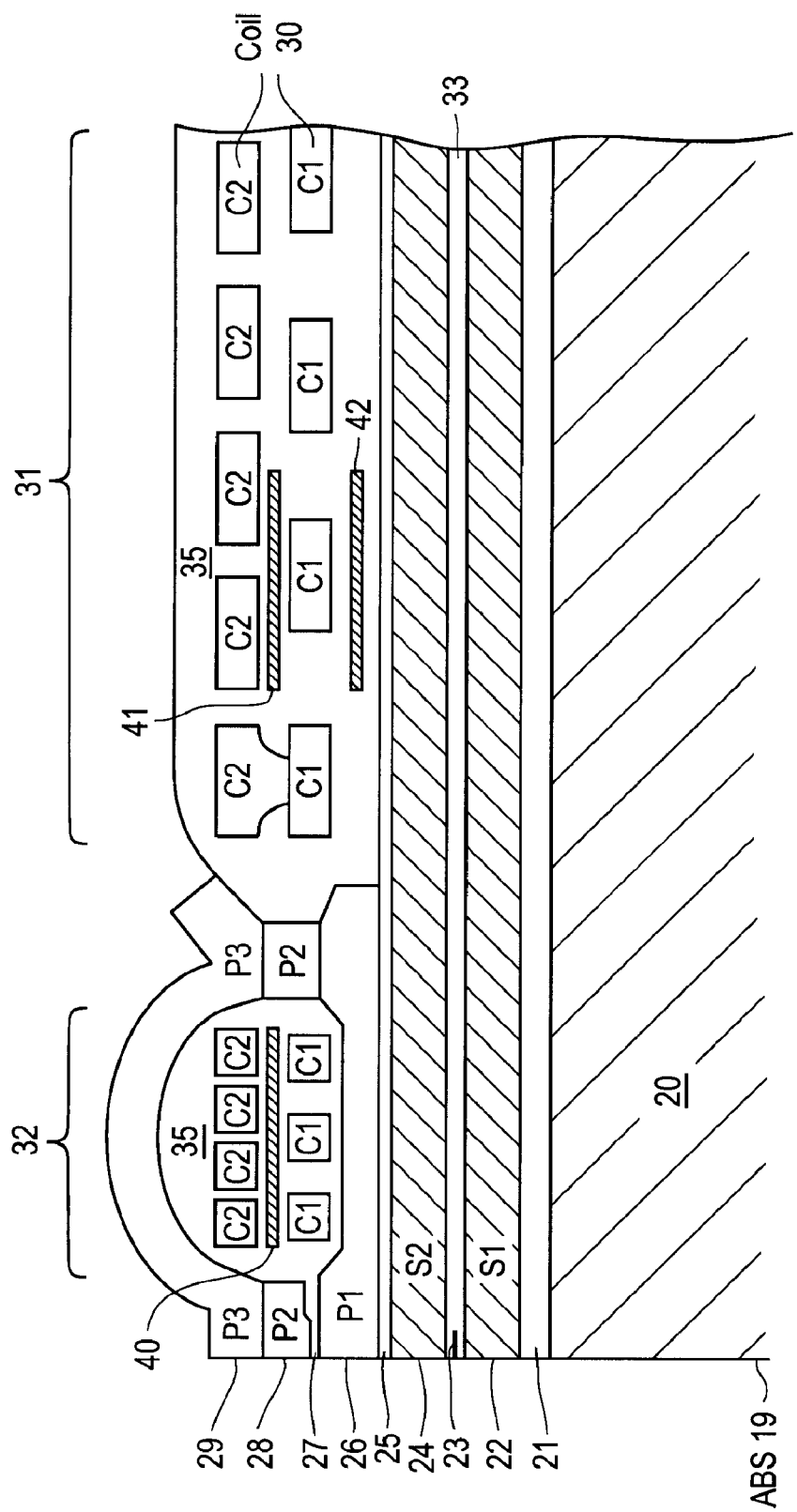
FIG. 3 is cross-sectional view of an exemplary embodiment of a magnetic transducer of a head including three alternative exemplary embodiments of a head-based flying height actuator capable of use with the present invention.

FIG. 3 is cross-sectional view of an exemplary embodiment of a magnetic transducer shown to include three alternative exemplary embodiments of a head-based flying height actuator. FIG. 3 is not to scale; rather, certain dimensions have been exaggerated so that each of the sub-components of the magnetic transducer can be labeled. The magnetic transducer of FIG. 3 comprises a layered structure formed on the trailing-side surface of a slider 20. Slider 20 may comprise AlTiC ($Al_2O_3$—TiC). The magnetic transducer is constructed by depositing and etching various layers on the slider 20 and comprises the magnetically active parts of the slider.

The reader layers of the magnetic transducer of FIG. 3 include an undercoat 21 consisting of a nonmagnetic material such as alumina ($Al_2O_3$); a lower (S1) magnetic shield layer 22 consisting of a soft magnetic material (e.g., NiFe, FeN, CoFe, etc.); a conventional magnetoresistive (MR) element 23 embedded in a nonmagnetic material layer 33; and an upper (S2) magnetic shield layer 24 consisting of a soft magnetic material. The nonmagnetic material layer 33 disposed between layers 22 & 24 and around MR element 23 may comprise aluminum nitride (AlN), aluminum nitrate ($AlNO_3$), or alumina. Information magnetically recorded in the media can be reproduced by detecting changes in the electrical resistance of MR element 23, which occur in response to remnant magnetic fields from a nearby disk media.

The writer layers of the magnetic transducer of FIG. 3 include a first magnetic pole layer 26 consisting of a soft magnetic material; a gap layer 27 comprising a nonmagnetic material 35 (e.g., alumina) that also surrounds the first and second turn layers (C1 & C2) of a coil 30, and is also used in separation layer 25; a second magnetic pole layer 28; and a third magnetic pole layer 29. The second and third magnetic pole layers 28 & 29 typically comprise a soft magnetic material and are connected together. One section of pole layer 26 is also connected to a section of pole layer 28. Alternatively, first pole layer 26 and upper shield layer 24 may be formed as a single integral layer, rather than as the two layers separated by nonmagnetic layer 25.

Collectively, the first, second, and third pole layers comprise the yoke portion 32 of the magnetic transducer. In the magnetic transducer shown in FIG. 3, coil 30 has a first layer of turns C1 and a second layer of turns C2 which pass through the yoke portion 32 of the magnetic transducer (i.e. the portion nearest the trailing edge of ABS 19 between pole layers 26 & 29). The turns of coil 30 also pass outside of the yoke portion in a region 31 that is farther from the trailing edge of ABS 19. A magnetic field can be generated across gap layer 27 by application of current to coil 30 to record information on a nearby magnetic disk media (not shown in FIG. 3).

An overcoat layer (not shown), consisting of a nonmagnetic material, typically covers the entire thin-film transducer. Also, a diamond-like carbon (DLC) material may also be applied to the magnetic transducer to protectively cover the pole tips and/or to enhance tribological performance by covering portions of ABS 19.

A resistive heating element 40 may be integrated into the thin-film transducer to cause protrusion of the pole tips of layers 26, 28 and 29. Resistive heating element 40 serves as a head-based flying height actuator because temporary application of power to the resistive heating element 40 causes a temporary expansion of at least the tips of poles 26, 28, and 29, such that the head-disk spacing at the location of the magnetic transducer is temporarily reduced. Alternatively, a resistive heating element in the position labeled 41, or in the position labeled 42, may serve as the head-based flying height actuator, the position being chosen to cause thermal pole tip protrusion, preferably with limited temperature rise in the magnetoresistive (MR) reading element 23.

Figure 4:
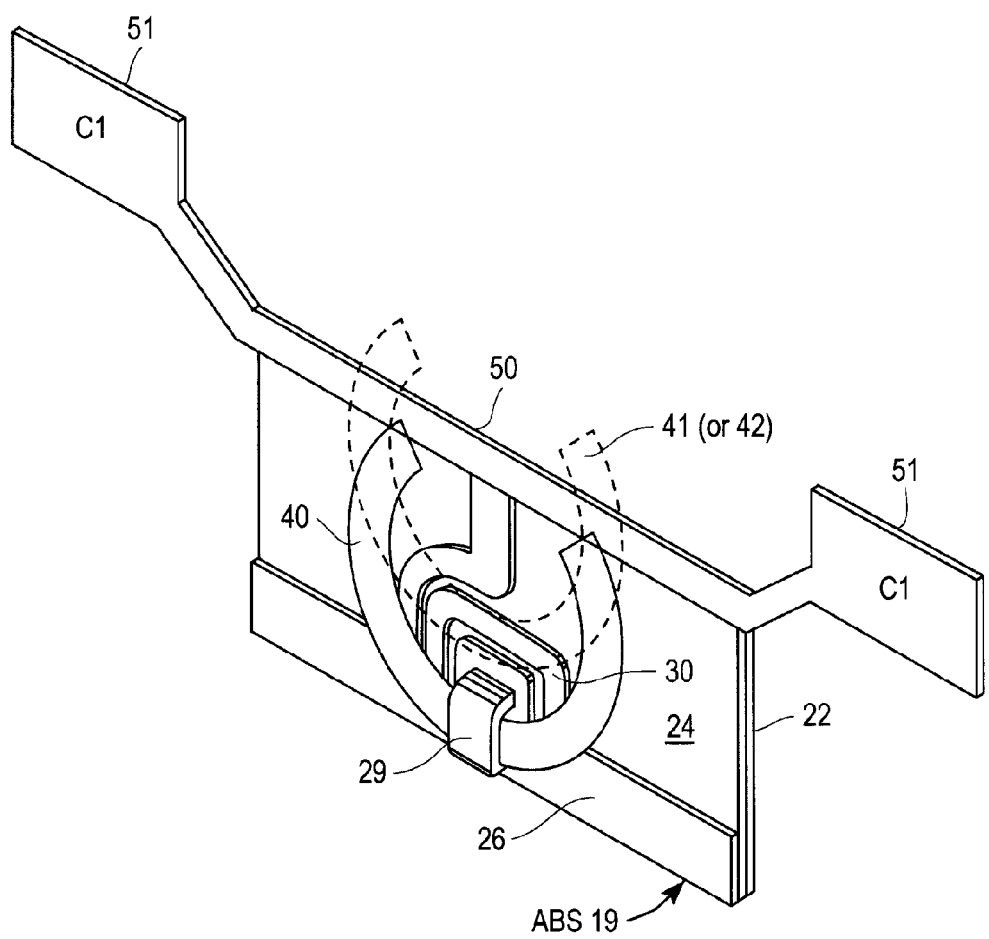
FIG. 4 is a perspective view of an exemplary embodiment of a magnetic transducer of a head having three alternative exemplary embodiments of a head-based flying height actuator.

FIG. 4 is a perspective view of a read/write transducer of a head shown to include three alternative exemplary embodiments of a head-based flying height actuator capable of use with the present invention (not necessarily to scale). Number labels in FIG. 4 accord with those used for the same or similar components shown in FIG. 3. As shown in FIG. 4, resistive heating element 40 may have a generally annular shape, e.g., like a horseshoe, having a middle portion passing through the yoke, and having first and second arms that extend away from ABS 19. In another embodiment (not shown), a plurality of heating elements may be implemented. For example, in an exemplary embodiment, the head may include a first resistive heating element closer to the read head than the write head and a second resistive heating element closer to the write head than the read head. These separate resistive heating elements may be independently operated to optimize the control over the flying height of the head. Coil connection 50 extends in a direction approximately parallel to ABS 19 and electrically connects coil 30 with a pair of terminal bond pads 51 of the C1 layer. Coil connection 50 is disposed in the same general plane as the C1 coil layer. Alternatively, resistive heating element 41 (or 42) may be located farther away from ABS 19. For example, the portion of heating element 41 nearest the air-bearing surface may be disposed 20 μm to 60 μm from ABS 19.

Figure 5:
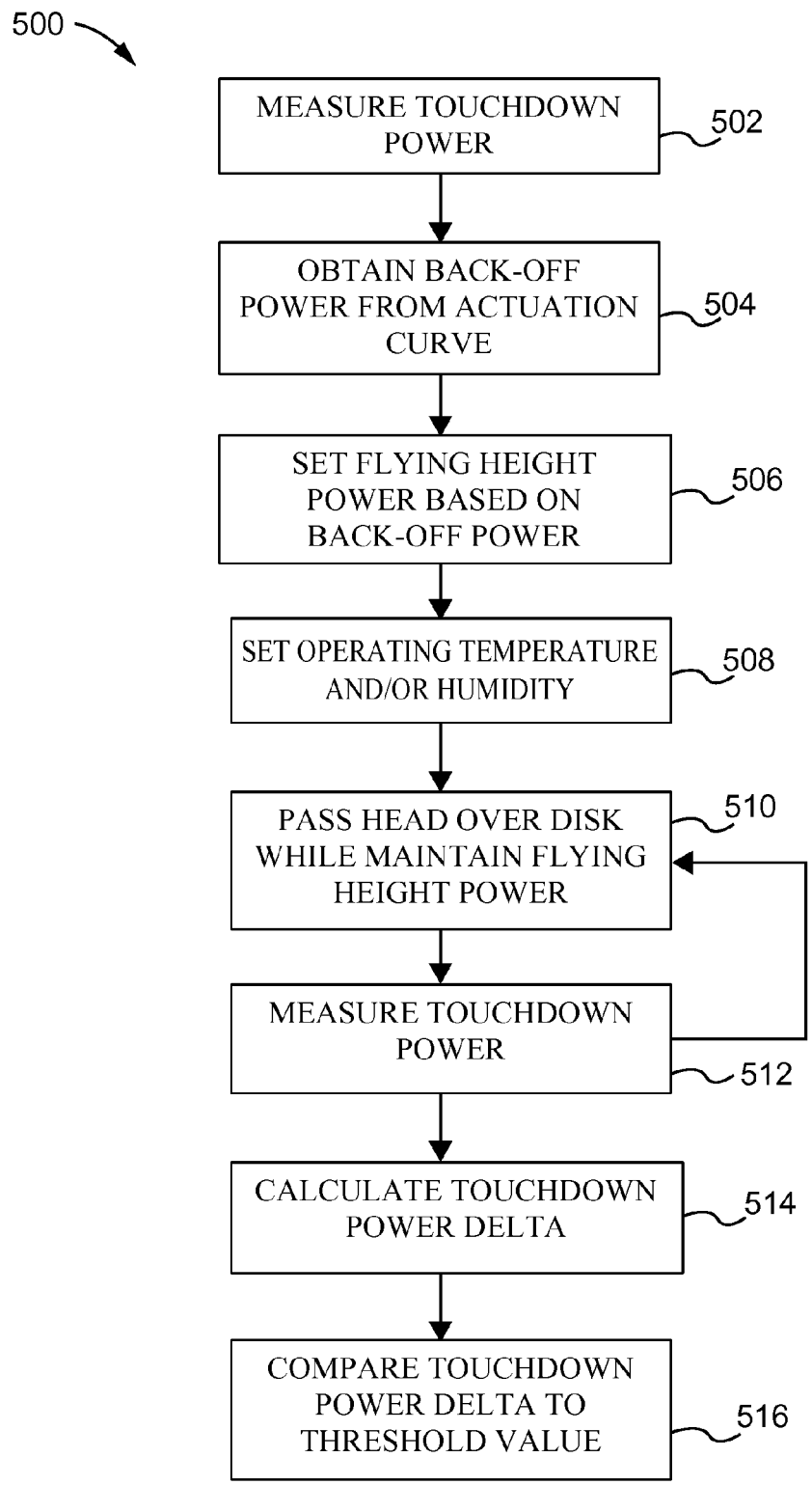
FIG. 5 is flow chart of an exemplary embodiment of a method of testing a head for contamination.

Turning to FIG. 5, a method 500 of testing a head for contamination will now be described. Prior to starting the method, a head gimbal assembly and disk are loaded onto a testing apparatus. The testing apparatus may be any apparatus capable of sweeping the head at a dynamic fly height across a spinning magnetic disk, as well as measuring the "touchdown power" of the head. In some exemplary embodiments, the testing method is applied on a read/write transducer head in an operating Hard Disk Drive (HDD). The touchdown power of the head is the amount of electrical power, that, when applied to the head-based flying height actuator, causes the head to contact the disk. More specifically, touchdown is defined to occur when the transducer-disk spacing is reduced to the point where the head is in intermittent contact with a corresponding disk. The power applied to the head-based flying height actuator when touchdown occurs is thus defined to be the touchdown power.

Reference is made throughout this disclosure to measuring touchdown power. Any suitable known method of measuring touchdown power may be used. For example, touchdown power may be detected through disk slow down, readout channel noise, strain gauges, PES variations, and/or acoustic emission. Example methods of measuring touchdown power are described in U.S. Pat. Nos. 7,436,620; 7,489,466; 7,796,356; 7,800,858; 8,139,310; 8,279,550; and 8,665,546, each of which is expressly incorporated by reference herein. Multiple methods may also be used simultaneously to ensure accurate results.

Once the head gimbal assembly and disk are loaded onto the testing apparatus, the method may begin with step 502 where the touchdown power of the head from the inner diameter (ID) to the outer diameter (OD) of the disk is measured. Measuring the touchdown power may include measuring the touchdown power at a plurality of radii of the disk. For example, in one exemplary embodiment the touchdown power may be measured along nine different radii of the disk. As used herein, in an exemplary embodiment, "different radii" mean different distances from the ID in a radial direction. For example, a 3.5 inch disk (i.e., a disk having a 3.5 inch diameter) would have a 1.75 inch radius. One radius of the plurality of radii may be at 0.5 inches from the ID in a radial direction, while another radius of the plurality of radii make be at 1.0 inches from the ID in a radial direction. The plurality of radii may be selected such there is an equal distance between measurements. For example, in the exemplary embodiment where the touchdown power is measured across nine radii, the measurement may be taken at about every 0.194 inches along the radius of the disk for a 3.5 inch disk (having 1.74 inch radius). Thus, after completing step 502, the touchdown power of the head for at least one radius, more preferably a plurality of radii is obtained. As mentioned above, the touchdown power may be measured according to any suitable method known in the art.

The method may then proceed to step 504 where a "back-off power" is obtained from an actuation curve. The back-off power is the amount of power that, when subtracted from the touchdown power, will cause the head to optimally fly just above the surface of the disk. In other words, because the touchdown power would cause the head to contact the disk, if the touchdown power minus the back-off power is applied to the head-based flying height actuator, the head will fly just above the surface of the disk (e.g., within 1 nm). As discussed above, in an exemplary embodiment the head-based flying height actuator may include a resistive heating element or a plurality of heat resistive elements. Any method known in the art for preparing the actuation curve and using the actuation curve to determine the back-off power may be used in step 504. For example, U.S. Pat. No. 7,436,620 describes a method of determining a unique back-off power for a particular head. That is, just as the touchdown power is unique for a particular head, the back-off power is also unique to a particular head. For example, parameters of the head design that determine the relationship between back-off power and touchdown power include air bearing design, transducer design, materials and sensitivity, and fly height actuator stroke and gain. The temperature and humidity in which the head operates can also impact the relationship. Following the method described in U.S. Pat. No. 7,436,620 the relationship between back-off power and touchdown power (i.e., the actuation curve) is established. The relationship can be treated as approximately linear, characterized by a slope and a y-intercept, the slope and the y-intercept being chosen to minimize a sum of squared discrepancies between the back-off powers determined for the head, and corresponding back-off powers predicted by the linear relationship for the head. The actuation curve for a particular head or population of heads may be established independently of method 500. In other words, when performing step 504, the actuation curve preferably has already been established for the head being tested in accordance with any suitable method known in the art (e.g., the method of U.S. Pat. No. 7,436,620).

As noted above, the touchdown power may be determined in step 502 for a plurality of radii from ID to OD. The determined touchdown power may have a different value at different radii. Accordingly, the actuation curve may be used to establish the back-off power for each individual radius for which the touchdown power has been determined.

Once the back-off power has been determined, the method may proceed to step 506 where the flying height power (also referred herein as "operating power") is set. The flying height power is the power that, when applied to the head-based flying height actuator, allows the head to fly over the disk optimally. Thus, the flying height power is equal to the touchdown power determined in step 502 minus the back-off power obtained in step 504. The flying height power is also known as the dynamic flying height power because the flying height actuator can be actively controlled to apply or remove the flying height power as necessary during operation of the drive. For example, when the head is reading or writing, it is desirable for the head to be at the optimum height and thus the flying height power should be applied to the flying height actuator during reading and writing. However, when the head is not reading or writing it is suitable for the head to fly at a relatively higher elevation than during the reading and writing. Thus, the flying height power generally need only be applied to the flying height actuator during reading or writing during operation of the hard disk drive. For purposes of method 500, the flying height power is applied from ID to OD to simulate the reading and writing height that occurs during operation of the manufactured HDD.

As noted above, the back-off power may be determined in step 504 for a plurality of radii from ID to OD because the determined touchdown power may be different for each radius. Accordingly, step 506 may include setting the flying height power for each radius of the plurality of radii. For example when the back-off power is determined for nine separate radii, step 506 may include setting the flying height power for each radius of the nine radii. Thus, the amount of power necessary to obtain the desired flying height across from ID to OD may change as the head moves across the disk.

After setting the flying height power in step 506, the method my optionally proceed to step 508 where the testing temperature and/or humidity conditions are set, if necessary. As noted above, two of the factors that may impact the actuation curve used in step 504 are temperature and humidity. If the obtained actuation curve was based on a particular temperature and/or humidity, such as a predicted disk drive operating temperature, then it would may be desirable to bring the testing apparatus to the same temperature and/or humidity (generally elevated temperature and/or elevated humidity as compared to ambient conditions). The testing apparatus may be located in a chamber that can be heated to the desired temperature and raised to the desired humidity. Step 508 is not necessary when the testing conditions are ambient temperature and ambient humidity, in which case step 508 can be skipped.

Once the temperature and/or humidity of the chamber have reached the target temperature and/or target humidity, or if increasing the temperature and/or humidity is not necessary, the method will proceed to step 510. In step 510 the head is passed over the entire surface of the disk from ID to OD and then back to ID (or from OD to ID and back to OD). Traveling from ID to OD and back to ID (or OD to ID and back to OD) is considered one cycle. As the flying height power was set in step 506, the flying height power is applied to the flying height actuator during the cycle. When a plurality of flying height powers have been set (i.e., when a distinct flying height power has been set for each radius of a plurality of radii), the control system will apply the appropriate flying height power to the flying height actuator as the head passes over the corresponding radius. For example, when nine flying height powers have been set for nine radii, the flying height power applied will change at each of the nine radii as the head travels from OD to ID and back to OD.

In one exemplary embodiment, prior to passing the head over the disk for the first cycle, the method may include measuring the touchdown power of the head. As discussed above, any suitable method of measuring touchdown power may be used. Preferably, the chosen method of measuring touchdown power should remain consistent. Because the head has yet to pass over the disk the touchdown power measured prior to the first cycle should be the same as the touchdown power measured in step 502. Thus, the optional touchdown power measurement prior to the first cycle may serve as an error control step. If the measured touchdown power has changed significantly from the first measurement, then the operator knows that an error has occurred. If an error has occurred, then the operator may start the method over and/or inspect the instruments. If no error has occurred, or if this step is skipped, the method may proceed to perform step 510 and pass the head over the disk for one cycle using the set flying height power from step 506.

After passing the head over the disk for one cycle, the method may then proceed to step 512. At step 512, the touchdown power for the head is again measured. As discussed above, any suitable method of measuring touchdown power may be used. Preferably, the chosen method of measuring touchdown power should remain consistent. When the flying height power has been set for a plurality of radii, step 512 would include measuring the touchdown power for each of the same radii.

After measuring the touchdown power of the head following the first cycle, in one exemplary embodiment, the method may proceed to repeat steps 510 and 512 for a plurality of cycles. That is, the method may return to step 510 where the head may once again pass over the disk from ID to OD and back to ID (or OD to ID and back to OD) at the set flying height power set in step 506. Then, the method may again proceed to step 512 where the touchdown power is determined following the second pass over the disk. The two steps of passing the head over the disk for a complete cycle and then determining the touchdown power after the passing of the head over the disk may be repeated as many times as necessary to satisfactorily determine whether the head has been contaminated beyond a threshold amount. Whether the contamination has exceeded the threshold amount is discussed in more detail below. In one exemplary embodiment the total number of times that steps 510 and 512 may be performed is at least two times and up to 12 times. In another exemplary embodiment the total number of times steps 510 and 512 may be performed is at least three times and up to 10 times. In another exemplary embodiment the total number of times that steps 510 and 512 may be performed is three times. In an exemplary embodiment the frequency of the passing of the head over the disk may be one complete cycle (i.e., ID to OD and back to ID) in on hour. Throughout all of the cycles the set flying height power remains the same. When multiple cycles are performed the touchdown power may be measured for each of the plurality of radii after each cycle.

After steps 510 and 512 have been performed or repeated for the desired number of times, the method may proceed to step 514 where a change in touchdown power is calculated by comparing the highest measured touchdown power with the lowest measured touchdown power. This difference is referred herein as the touchdown power delta. For example, in an exemplary embodiment where the touchdown power has been measured for a single point along the radius of the disk, and if only one cycle has been performed, then the only data collected is the touchdown power prior to the first cycle and a the touchdown power after the first cycle. Thus, in this example case, the touchdown power cycle is the post-cycle touchdown power subtracted from the initial touchdown power delta. If multiple cycles have been performed, then the lowest measured touchdown power over all cycles is subtracted from the highest measured touchdown value. Because more contamination on the head requires less power to touchdown, the highest touchdown power is generally the touchdown power detected prior to the first cycle of passing the head over the disk. In an exemplary embodiment where the touchdown power is measured for a plurality of radii (e.g., nine radii), the touchdown power delta is calculated for each individual radius. For example, if three cycles are performed and the touchdown power is measured for nine radii after each cycle, the lowest touchdown power measured across all cycles for the first radius is subtracted from the highest touchdown power measured across all cycles for the same first radius, thus arriving at a touchdown power delta for the first radius. Similarly, the touchdown power delta for the second radius is calculate by subtracting the lowest measured touchdown power across all cycles for the second radius from the highest measured touchdown power across all cycles for the second radius. The same approach is performed for all of the plurality of radii (e.g., nine touchdown deltas are calculated when nine radii are used).

After the touchdown delta is calculated, or the plurality of touchdown deltas (one for each radius) are calculated, the method proceeds to step 516, where the touchdown delta is compared to a threshold value that corresponds to contamination on the head. Specifically, because less power is required for touchdown when the head is contaminated, it can be determined what touchdown delta value, once exceeded, indicates that the amount of contamination on the head has passed an acceptable level. Thus, if the measured touchdown delta is above a threshold value, it can be determined that there is an unacceptable level of contamination on the head. In one exemplary embodiment, the threshold delta value may be 10 mW or greater. As used herein "about" means within accepted operating tolerances. Thus, in the exemplary embodiment where a single delta touchdown power is calculated for a single radius, if the calculated touchdown power delta is greater than the threshold touchdown power delta (e.g., 10 mW is selected as the threshold value and the touchdown power delta is greater than 10 mW), then it is determined that the contamination on the head exceeds an acceptable amount. In the exemplary embodiment where a plurality of touchdown power deltas have been calculated (e.g., for a plurality of radii), if any single touchdown power delta of the plurality of touchdown power deltas exceeds the threshold amount (e.g., 10 mW is selected for the threshold value and one of the touchdown power deltas are above 10 mW), then it is determined that that the amount of contamination on the head exceeds an unacceptable level. It should be understood that the threshold touchdown power delta value may be chosen based upon the particular requirements of the particular application. For example, more contamination may be acceptable for certain products while less contamination is needed for other products. Thus, a less stringent (using a higher value for the threshold power delta) or more stringent threshold (using a lower value for the threshold value delta) may be chosen. Furthermore, when multiple touchdown power deltas are calculated for multiple radii, a less stringent test may be used in which only certain radii must not exceed the threshold or a certain number of radii must exceed the threshold before the contamination is deemed unacceptable.

In addition to comparing the touchdown power deltas to the touchdown power delta threshold, the method may optionally include a step of imaging the head to visually determine whether the contamination level is unacceptable. This may be performed using a scanning electron microscope. The image obtained may then be visually inspected either by a human or a machine to determine whether the amount of contamination is unacceptable. The method may also include identifying the composition of the contamination. This may be performed by using Time-of-Flight Secondary Ion Mass Spectrometry (TOF-SIMS). However, it should be understood that these additional steps of visual inspection and composition identification are not necessary and may be performed as a secondary check to verify the accuracy of the test.

If it is determined in step 516 that the amount on contamination on the head does indeed exceed an acceptable amount, then it can be concluded that the particular disk being tested has a flaw. That is, the test has shown that the disk being tested imparts an unacceptable level of contamination (e.g., metallic particles) onto the head during operation. The disk manufacturing process may then be modified until the disks produced no longer fail the contamination test. By obtaining this information prior to forming the final hard drive, significant time and cost is saved in the hard disk drive manufacturing process.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A method of testing a head for contamination, the method comprising:
   detecting a first touchdown power of the head, the head having a flying height actuator;
   calculating a back-off power for the head using an estimated relationship between back-off power and touchdown power;
   determining an operating power that is equal to the detected first touchdown power minus the calculated back-off power;
   passing the head over a magnetic media one or more times while applying the determined operating power to the flying height actuator;
   detecting a second touchdown power after passing the head over the magnetic media; and
   determining whether contamination on the head exceeds a threshold amount based on the detected second touchdown power.

2. The method of claim 1, further comprising calculating a difference between the first detected touchdown power and the second detected touchdown power, wherein the determining of whether contamination on the head exceeds a threshold amount is based on the calculated difference.

3. The method of claim 2, wherein the determining of whether contamination on the head exceeds a threshold amount comprises comparing the calculated difference to a threshold touchdown power.

4. The method of claim 3, wherein the comparing of the calculated difference with the threshold touchdown power further comprises determining whether the calculated difference is greater than the threshold touchdown power.

5. The method of claim 4, wherein the threshold touchdown power is about 10 mW or greater.

6. The method of claim 1, wherein passing of the head over the magnetic media comprises moving the head from the inner diameter to the outer diameter and back to the inner diameter.

7. A method of testing a head for contamination, the method comprising:
   detecting an initial touchdown power of the head, the head having a flying height actuator;
   calculating a back-off power for the head using an estimated relationship between back-off power and touchdown power;
   applying an operating power to the flying height actuator that is equal to the detected initial touchdown power minus the calculated back-off power;
   passing the head over a magnetic media a plurality of times while applying the operating power to the head;
   detecting a subsequent touchdown power after each passing of the head over the magnetic media, thereby obtaining a plurality of subsequent touchdown powers; and
   determining whether contamination on the head exceeds a threshold amount based on at least one of the subsequent touchdown powers.

8. The method of claim 7, wherein the plurality of times comprises 10 to 12 times.

9. The method of claim 7, wherein the plurality of times comprises 2 to 4 times.

10. The method of claim 7, wherein each passing of the head over the magnetic media comprises moving the head from the inner diameter to the outer diameter and back to the inner diameter.

11. The method of claim 7, further comprising calculating a difference between the initial detected touchdown power and each of the subsequent detected touchdown power, wherein the determining of whether contamination on the head exceeds a threshold amount is based on at least one of the calculated differences.

12. The method of claim 11, wherein the determining of whether contamination on the head exceeds a threshold amount is based on the calculated difference having the highest value of the calculated differences.

13. The method of claim 11, wherein the determining of whether contamination on the head exceeds a threshold amount comprises comparing the at least one of the calculated differences to a threshold touchdown power.

14. The method of claim 13, wherein the comparing of the at least one of the calculated differences with the threshold touchdown power further comprises determining whether the at least one of the calculated differences is greater than the threshold touchdown power.

15. The method of claim 13, wherein the threshold touchdown power is about 10 mW or greater.

16. A method of testing a head for contamination, the method comprising:
   detecting a first touchdown power of the head at a plurality of discrete points along a radius of the magnetic media, the head having a flying height actuator;
   calculating a back-off power for the head for each of the plurality of discrete points using an estimated relationship between back-off power and touchdown power;
   determining an operating power for each of the plurality of discrete points, wherein the operating power for each of the plurality of discrete points is equal to the detected first touchdown power of a particular point minus a corresponding calculated back-off power for the particular point;
   passing the head over a magnetic media one or more times while applying the determined operating power to the flying height actuator for each of the plurality of discrete points;
   detecting a second touchdown power for each of the plurality of discrete points after passing the head over the magnetic media; and
   determining whether contamination on the head exceeds a threshold amount based on the detected second touchdown power for at least one of the discrete points.

17. The method of claim 16, further comprising calculating a difference between the first touchdown power and a corresponding second detected touchdown power for each of the plurality of discrete points, wherein the determining of whether contamination on the head exceeds a threshold amount is based on the calculated difference for at least one of the plurality of discrete points.

18. The method of claim 17, wherein the determining of whether contamination on the head exceeds a threshold amount comprises comparing the calculated difference for the at least one of the plurality of discrete points to a threshold touchdown power.

19. The method of claim 18, wherein the comparing of the calculated difference for the at least one of the plurality of discrete points with the threshold touchdown power further comprises determining whether the calculated difference for the at least one of the plurality of discrete points is greater than the threshold touchdown power.

20. The method of claim 19, wherein the threshold touchdown power is about 10 mW or greater.

21. The method of claim 16, wherein passing of the head over the magnetic media comprises moving the head from the inner diameter to the outer diameter and back to the inner diameter.

* * * * *